United States Patent [19]
Holmes

[11] 4,121,643
[45] Oct. 24, 1978

[54] TIRE AND WHEEL ASSEMBLIES

[75] Inventor: Thomas Holmes, Sutton Coldfield, England

[73] Assignee: Dunlop Limited, London, England

[21] Appl. No.: 685,304

[22] Filed: May 11, 1976

[30] Foreign Application Priority Data

May 22, 1975 [GB] United Kingdom ............... 22114/75
Feb. 5, 1976 [GB] United Kingdom ................. 4547/76

[51] Int. Cl.² .............................................. B60B 21/12
[52] U.S. Cl. ......................... 152/366; 152/381.2 WF; 152/405
[58] Field of Search ............... 152/396, 366, 399, 400, 152/401, 405, 158, 381.2, 381.1; 301/97, 63 D

[56] References Cited

U.S. PATENT DOCUMENTS

| | | | |
|---|---|---|---|
| 1,032,125 | 7/1912 | Dorsey | 152/366 |
| 3,708,847 | 1/1973 | Mitchell | 152/379 X |
| 3,918,508 | 11/1975 | Mitchell | 152/381 A |
| 3,968,825 | 7/1976 | Mitchell et al. | 152/396 X |

FOREIGN PATENT DOCUMENTS

22,669 of 1892 United Kingdom ..................... 152/396

*Primary Examiner*—Robert B. Reeves
*Assistant Examiner*—Francis J. Bartuska
*Attorney, Agent, or Firm*—Stevens, Davis, Miller & Mosher

[57] ABSTRACT

A pneumatic tire and wheel rim assembly comprises a one-piece wheel rim comprising a pair of annular flanges, inwardly of the outboard rim flange a bead seat adjacent and axially inwardly of which is a circumferential notch, a center portion of diameter substantially equal to the diameter of the bead seat, a well wide enough to accept a single tire bead adjacent the inboard rim flange and a blanking member blanking off said well and acting as at least a part of a bead seat for the inboard bead of the tire.

14 Claims, 3 Drawing Figures

TIRE AND WHEEL ASSEMBLIES

This invention relates to pneumatic tire and wheel rim assemblies and wheel rim assemblies therefor.

A conventional pneumatic tire and wheel rim assembly used on light vehicles such as automobiles, light vans etc. consists of a pneumatic tire having a tread portion a pair of sidewall portions and a pair of beads each reinforced by an inextensible bead core, and a wheel rim having a pair of annular flanges, bead seats for the tire beads and a portion of reduced diameter between the bead seats normally referred to as a well.

It is a well-known problem that if such an assembly loses much or all of its inflation pressure the tire beads are liable to become unseated and lose contact with the wheel rim so that the tire behavior becomes uncontrollable.

A number of solutions to this problem have been proposed which involve covering or filling the well of the wheel. These provide a degree of safety in that the tire beads can no longer totally lose contact with the wheel rim and this is generally sufficient to enable a vehicle to stop without loss of control after a tire deflation.

However, in order to enable a vehicle to be driven in a normal manner at speeds of, for example, 40 m.p.h. after tire deflation we have found that it is necessary to retain a high degree of controllability. This is very difficult to achieve if the beads of the tire are free to move across the wheel rim. One method of restraining a bead of the tire is described in the assignee's U.S. Pat. No. 3,857,429 in which a radially inwardly directed annulus comprising elastomeric material on the bead of the tire rests in a notch in the wheel rim. The notch may conveniently be positioned at the split in a divided wheel rim, the use of which eliminates any need for a well for tire fitting.

Divided rims, however, also have disadvantages, particularly in terms of additional expense and weight when compared to a one-piece rim of equivalent size.

According to the present invention a pneumatic tire and wheel rim assembly comprises a one-piece wheel rim comprising a pair of annular flanges, inwardly of the outboard rim flange a bead seat adjacent and axially inwardly of which is a circumferential notch, a centre portion of diameter substantially equal to the diameter of the bead seat, a well wide enough to accept a single tire bead adjacent the inboard rim flange and a blanking member blanking off said well and acting as at least a part of a bead seat for the inboard bead of the tire.

The present invention also provides a one-piece wheel rim assembly comprising a pair of annular flanges, inwardly of the outboard rim flange a bead seat adjacent and axially inwardly of which is a circumferential notch, a centre portion of a diameter substantially equal to that of the bead seat and a well of sufficient width to receive a single tire bead positioned adjacent the inboard rim flange.

The present invention also provides a one-piece wheel rim blank comprising a pair of annular flanges, a bead seat extending axially inwardly from the outboard rim flange, a centre portion of a diameter substantially equal to that of the bead seat and two wells each of sufficient width to accept a single tire bead positioned respectively axially inwardly of but adjacent to the bead seat and adjacent to the inboard rim flange.

The circumferential notch may be located at the mouth of an axially compressed well in the rim. Alternatively the notch may be defined by a circumferential groove and a ledge which overlies a part of the rim base and projects into the groove.

Preferably a radially inwardly directed annulus comprising elastomeric material is provided on at least the tire bead on the outboard bead seat in order to rest in the notch and provide a restraint for the outboard bead.

The axial compression of a well portion of a wheel rim is carried out in a suitable press and is more fully described in the assignee's U.S. Pat. Nos. 3,895,667 and 3,818,565.

The blanking member for blanking off the well adjacent the inboard rim flange may be a band which covers the well or may be a solid ring of rubber which fills the well.

It is to be appreciated that the blanking member is to form at least part of the inboard bead seat so that it is essential that the member, whatever its type, must be strong enough to provide adequate support for the bead. In this connection it may be noted that a solid rubber well filler is able to fulfill this criterion since, although rubber is elastic, its modulus in compression is exceedingly high. An arrangement using a rigid segmented filler on a cushion of rubber in the well which is suitable to be used in this invention as described in copending U.S. patent application Ser. No. 685,611.

If desired a shelf may be provided between the inboard rim flange and the adjacent well to serve as a part of the bead seat for the heel of bead.

The tire consists of tread portion, sidewall portions and bead portions, the bead portions being reinforced by inextensible bead cores, and the sidewall and tread portions by a carcass which preferably consists of cords extending in substantially radial planes; additionally the tread portion is preferably braced by means of a belt of substantially inextensible cords. Such reinforcements are commonly used in conventional radial ply tires.

Preferably, however, the tire has a tread whose width is greater than the width of the wheel rim between flanges, more preferably greater in a ratio of at least 1.35 to 1. The tire preferably has sidewalls which are flexible to permit the repeated flexing to which they will be subjected if the tire is run at high deflections e.g. when deflated and which are short relative to the height of the tire section so as to permit as little sloppiness as possible in the tire structure when the tire is deflated.

The assembly of this invention is suitable to be used as an internally lubricated tyre and wheel assembly as described in U.S. Pat. Nos. Re. 28,587 and 4,007,769.

Tires which may be used in the assembly are described in U.S. Pat. Nos. Re 29,089; 3,851,691, and 3,964,532 and U.S. patent application Ser. No. 681,039.

The invention will now be described in more detail, by way of example only, with reference to the accompanying drawings in which.

Figure 1:
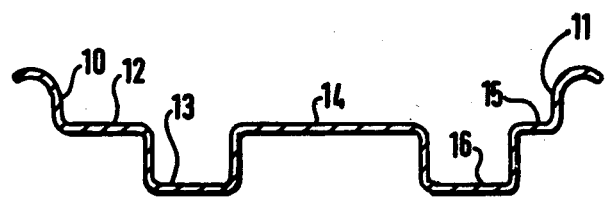
FIG. 1 is a diagrammatic cross-sectional view of a portion of a wheel rim blank.

As shown in FIG. 1 the wheel rim blank consists of a pair of annular flanges 10 and 11, and adjacent the inboard rim flange 11 a well 16 wide enough to accept a single bead. From well 16 the rim rises up to a central portion 14, on the other side of which is a second, rounded well portion 13 of the rim which is suitable to be axially compressed. Between the outboard flange 10 and the well 13 is a bead seat 12.

Figure 2:
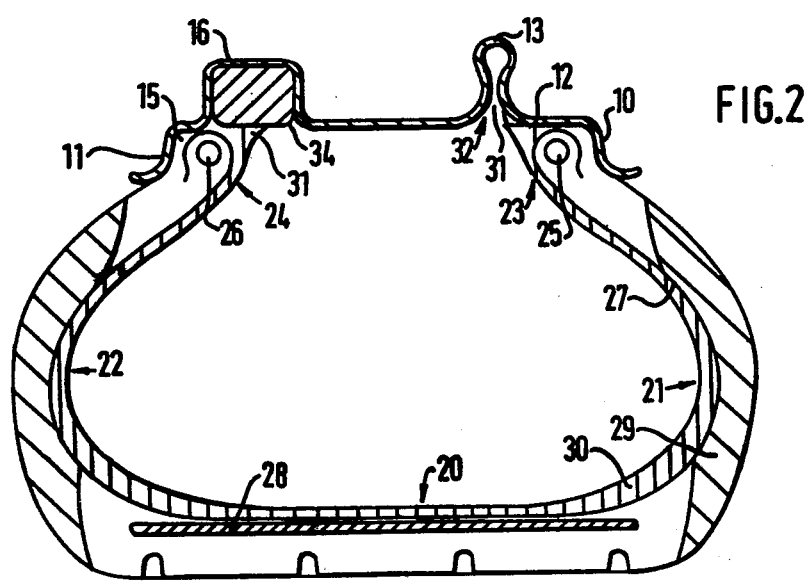
FIG. 2 is a diagrammatic cross-sectional view of a portion of a tire and wheel rim assembly in the inflated state.

FIG. 2 illustrates a tire and wheel assembly utilizing a blank such as is shown in FIG. 1.

The tire consists of a tread portion 20, sidewalls 21 and 22 and bead portions 23 and 24 reinforced by inextensible bead cores 25 and 26. The tire has a radial ply carcass 27 extending from bead to bead and the tread, which is wider than the wheel rim, is braced by a breaker assembly 28 (shown schematically). The rubber of the sidewalls outwardly of the carcass ply (rubber 29) and of the lining (rubber 30) has a high resilience, greater than 87% measured at 50° C. by the Dunlop Pendulum method. Each bead of the tire has a toe which extends into a radially inwardly directed annulus 31.

The outboard bead 23 is positioned on the bead seat 12 with its annulus 31 resting in a notch 32, formed by axial compression of the well 13 of the wheel rim, to act as a bead restraint as described in U.K. Pat. No. 1,395,714.

The inboard bead 24 is positioned against the flange and rests with its heel on a shelf 15 between the flange 11 and the well 16, the remainder of the bead resting on a rubber filler ring 34 which occupies the well 16 and effectively blanks it off. The annulus 31 of this bead is stretched flat over the rubber filler ring 34 to improve the fluid seal between the bead and the wheel rim when the assembly is deflated or under-inflated as described in U.S. Pat. No. 3,857,429.

The wheel centre is not shown in FIGS. 1 and 2. The wheel rim may be permanently attached to the wheel centre, e.g. by welding a conventional wheel disc to the centre portion 13 of the rim. Alternatively the wheel rim could be separate from the disc and clamped to it utilizing the lobular cross-sectional shape of the crimped well 14.

In putting together the tire and wheel rim assembly illustrated in FIG. 2 the rubber filling ring 34 is inserted in the well 16 and the tire fitted on the wheel rim blank using the well 13 which is to be axially compressed. The tyre beads are then blown into their seating positions and the final step is to axially compress, i.e. crimp up, the well 13 to close it to the bead 23 and form a notch 32 adjacent the bead seat 12.

The tire may be dismounted from the assembly when deflated as follows:

First the inboard bead 24 is pushed clear of the rubber filler ring 34 which is then removed from the well 16; then the inboard bead 24 is removed from the rim by normal use of the well 16; finally the outboard bead 23 is pushed beyond the notch 32 by means of a press tool applied to the tire above the rim flange 10 and then removed from the rim by means of the well 16 adjacent the inboard rim flange 11. Subsequent re-fitting of the tire may be carried out by reversal of this procedure.

Figure 3:
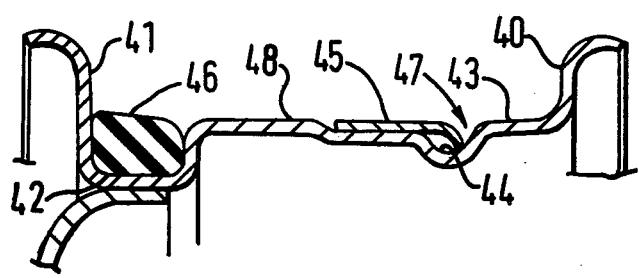
FIG. 3 is a diagrammatic cross-sectional view of a portion of an alternative wheel rim blank.

An alternative wheel rim blank is shown in FIG. 3. The blank consists of an outboard rim flange 40, and an inboard rim flange 41, with a well 42 wide enough to accept a single tire bead adjacent the inboard rim flange 41 and a bead seat 43 adjacent the outboard rim flange 40. Axially inwardly of the bead seat 43 is a circumferential notch 47 for receiving the radially inwardly directed annulus of a tire bead and, between the notch 47 and the well 42, is a central portion 48 of substantially the same diameter as the bead seat 43.

The notch 47 is formed between one side of a circumferential groove 44 formed adjacent the bead seat 43 and the turned edge of a circumferential ledge 45 which projects into the groove 44.

When a tire is mounted on the rim the inboard bead is positioned against the flange 41 and rests on a rubber filler ring 46 which occupies the well 42 and effectively blanks it off.

The procedure for mounting and removing a tire is identical with that described herein for an assembly of the type illustrated in FIG. 2 in which the well adjacent the outboard bead seat has been closed by axial compression.

Having now described my invention — what I claim is:

1. A pneumatic tire and wheel rim assembly comprising a pneumatic tire having inboard and outboard tire beads having toe portions, a one-piece wheel rim comprising annular inboard and outboard rim flanges, an outboard bead seat disposed inwardly of the outboard rim flange, a radially inwardly extending radially outwardly open circumferential notch defined by only said one-piece wheel rim and disposed adjacent and axially inwardly of the outboard bead seat, a center portion of diameter substantially equal to the diameter of the bead seat and a well wide enough to accept a single tire bead adjacent the inboard rim flange, said toe portion of said outboard bead extending radially inwardly into said notch, and a blanking member blanking off said well and acting as at least a part of a bead seat for the inboard bead of the tire.

2. A pneumatic tire and wheel rim assembly as claimed in claim 1 in which the circumferential notch is located at the mouth of an axially compressed well in the wheel rim.

3. A pneumatic tire and wheel rim assembly as claimed in claim 1 in which said toe portion of said outboard bead comprises a radially inwardly directed annulus comprising elastomeric material in order to rest in the notch and provide a restraint for the outboard bead.

4. A pneumatic tire and wheel rim assembly as claimed in claim 1 in which the blanking member for blanking off the well adjacent the inboard rim flange is a band which covers the well.

5. A pneumatic tire and wheel rim assembly as claimed in claim 1 in which the blanking member for blanking off the well adjacent the inboard rim flange is a solid ring of rubber which fills the well.

6. A pneumatic tire and wheel rim assembly as claimed in claim 1 in which a shelf is provided between the inboard rim flange and the adjacent well to serve as a part of the bead seat for the heel of the bead.

7. A pneumatic tire and wheel rim assembly as claimed in claim 1 in which said notch is substantially narrower axially than said well.

8. A pneumatic tire and wheel rim assembly as claimed in claim 7 in which said notch extends radially inwardly for a distance less than that of said well.

9. A pneumatic tire and wheel rim assembly comprising a pneumatic tire having inboard and outboard tire beads, a one-piece wheel rim comprising inboard and outboard rim flanges, an outboard bead seat disposed inwardly of the outboard rim flange, a radially inwardly extending circumferential notch disposed adjacent and axially inwardly of the outboard bead seat, a center portion of diameter substantially equal to the diameter of the bead seat and a well wide enough to accept a single tire bead adjacent the inboard rim flange, a blanking member blanking off said well and acting as at least a part of a bead seat for the inboard bead of the tire, and said notch being defined by a circumferential groove having a closed bottom and a ledge which extends axially, overlies and abuts a part of the center portion, and projects radially inwardly into the groove.

10. A pneumatic tire and wheel assembly as claimed in claim 9, wherein:
said beads have toe portions, and the toe portion of said outboard bead comprises a radially inwardly directed annulus comprising elastomeric material which extends radially inwardly into said notch and provides a restraint for the outboard bead.

11. A pneumatic tire and wheel rim assembly as claimed in claim 9 in which the blanking member for blanking off the well adjacent the inboard rim flange comprises a solid ring of rubber which fills the well.

12. A pneumatic tire and wheel rim assembly as claimed in claim 9, wherein:
said blanking member acts as the entire bead seat for the inboard bead of the tire.

13. A pneumatic tire and wheel rim assembly as claimed in claim 9 in which said notch is substantially narrower axially than said well.

14. A pneumatc tire and wheel rim assembly as claimed in claim 9 in which said notch extends radially inwardly for a distance less than that of said well.

* * * * *